Sept. 6, 1966 R. E. BONNER 3,271,739

MULTI-LEVEL TEST SYSTEM FOR SPECIMEN IDENTIFICATION

Filed Nov. 1, 1963 4 Sheets-Sheet 1

INVENTOR.
RAYMOND E. BONNER

BY John J. Goodwin

ATTORNEY

United States Patent Office 3,271,739
Patented Sept. 6, 1966

3,271,739
MULTI-LEVEL TEST SYSTEM FOR SPECIMEN IDENTIFICATION

Raymond E. Bonner, Yorktown Heights, N.Y., assignor to International Business Machines Corporation, New York, N.Y., a corporation of New York Filed Nov. 1, 1963, Ser. No. 320,786
9 Claims. (Cl. 340—146.3)

The present invention relates to specimen recognition and identification systems and more particularly to a multi-level system for recognizing and identifying sample specimens as members of particular specimen sets.

There are many practical situations wherein it is desirable to identify an unknown input specimen as being a member of a particular class, for example in the pattern recognition and speech recognition technologies. In systems designed for specimen recognition, it is usual that the characteristics of the unknown specimen are determined, and a decision is then made as to the class of which the specimen is a member. There are various known methods of accomplishing such decision, one example being correlation, with the particular method employed by any one system being determined by the environment in which the system is to be employed.

It is possible that recognition systems may fail to properly identify an unknown specimen, with a common form of error being termed "substitution errors." A substitution error occurs when the system incorrectly identifies the input specimen of a given class as a member of a different class. A substitution error is generally accepted as valid since there is no way of determining that it is an error. It is therefore very desirable that a specimen identification system be provided wherein substitution errors do not occur.

In the present invention, an embodiment of which will be described hereinbelow, a specimen recognition system is provided wherein such substitution errors will not occur when the system is operating with the specimen sets for which it is designed. The specimen recognition system of the present invention includes means for performing a form of test herein referred to as an inclusive test.

An inclusive test is defined herein as a test which will be passed by all members of the class for which it is designed. Generally, the test is designed to respond to a characteristic which is common to all members of the particular class. For example, an inclusive test for all the letter E's on a printed page might be designed to pass all letters having a horizontal crossbar at the top. Such letters as F, J, and T will also pass the test, but the significant feature is that no E's will fail the test. A second inclusive test may then be coupled to the output of the first inclusive test to respond to a second characteristic of the letter E, for example, a horizontal crossbar at the bottom of the letter. Thus such letters as F, J, and T will fail the second inclusive test but all members of the class E will be passed. Such letters as L satisfies the second inclusive test, however not having passed the first inclusive test (no horizontal crossbar at the top) members of class L will not reach the second inclusive test.

One feature of the inclusive test is that it can be constructed using only positive instances of the class for which it is designed. In the absence of complete information, this is often all that is available. It is also possible that the number of the other members not of the class in question may be too overwhelmingly large to handle by other methods, whereas for the inclusive test knowledge of the other members not in the class in question is not necessary.

The inclusive test can also be easily revised. If a new sample of the class in question is introduced which is not capable of passing the test, the test must be expanded to also include the new sample. This expansion can be done without knowledge of the individual samples originally used to construct the test.

The inclusive test is particularly adaptable to the problems of specimen recognition in that it is simply constructed, and an inclusive test may be employed for practically all forms of specimen recognition environments, which is not generally true of other recognition schemes such as correlation. As further advantages, inclusive tests may be automatically constructed, that is, they may be self-adaptive, and systems including inclusive test means may be designed such that tests for new classes of specimens may be added thereto without the necessity of reconstructing the tests in the original portion of the system.

In a copending U.S. patent application Serial No. 320,788 of Raymond E. Bonner, filed Nov. 1, 1963, and assigned to the present assignee, a specimen recognition system is described wherein each specimen set is handled by a separate test channel including a series of inclusive tests. The first test means in each channel performs an inclusive test for specimens of the related specimen set. The next test means in each channel performs an inclusive test for specimens of the other specimen sets capable of passing the first inclusive test. The third test means in each channel performs an inclusive test for specimens of the related specimen set capable of passing the second inclusive tests. Thus, each channel contains a series of inclusive tests which alternate between performing an inclusive test for specimens which are members of the related specimen set and for specimens which are members other than the related specimen set. In the copending application there is no interaction between the test means in each of the separate channels.

In the present invention a system is described wherein each specimen set is handled by a separate test channel, however the inclusive test means in each channel perform an inclusive test for specimens which are members of the related specimen set. Also, the results of the inclusive test means in each channel effects the operation of the next level of test means in the other channels providing for interaction between the separate channels.

An object of the present invention is to provide a specimen recognition system for determining the identities of unknown input specimens.

Another object of the present invention is to provide a specimen recognition system including inclusive test means.

Still another object of the present invention is to provide a specimen recognition system wherein substitution errors will not occur with the specimen sets designed therefor.

A further object of the present invention is to provide a specimen recognition system wherein tests for specific specimen classes are arranged in separate channels and wherein the test results of the tests in each channel are employed in the operation of the tests in the other channels.

The foregoing and other objects, features and advantages of the invention will be apparent from the following more particular description of a preferred embodiment of the invention, as illustrated in the accompanying drawings.

Figure 1:
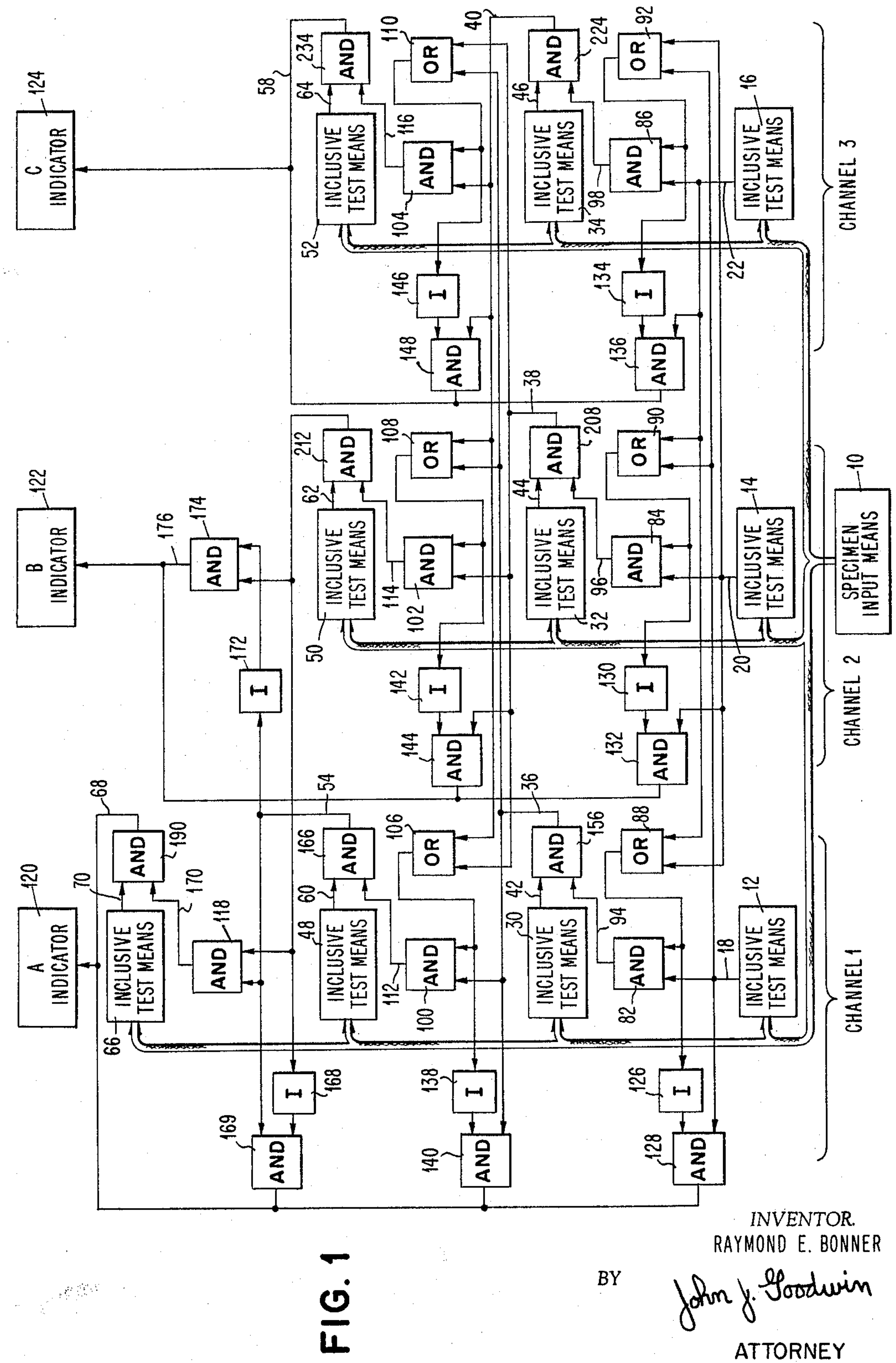
FIG. 1 is a block diagram of an embodiment of a specimen recognition system following the principles of the present invention.

Before discussing the illustrated embodiment, an example of representative specimen sets will be presented with which the embodiment will be related. The invention described herein is universal to specimen sets in general, in any environment, and is not limited to speech specimens, pattern specimens, etc. In order to give a clear understanding of the principles of the invention, specific sets of specimens will be defined, and an embodiment in accordance with the principles of the present invention will be set forth to handle the specimens of the specific sets.

Consider a plurality of specimen sets, each set including a plurality of specimens which constitute the set. The sets and the specimens therein may relate to any of a large number of indicia. For example, in character recognition each set may be a separate alphabetical character and the specimens in each set may be the total number of ways such character may be depicted, i.e., block form, handwritten, gothic, etc. In speech recognition, each set may be a separate vocal sound, and the specimens within each set may be the different ways such vocal sound is spoken by a number of different speakers. The present invention describes a specimen recognition system which, when presented with a sample specimen which may be a member of one of a plurality of different sets, will identify the set of which the sample specimen is a member.

The present invention will be described with relation to sets composed of specimens wherein the specimens are set forth as ten digit binary numbers. The invention is not necessarily restricted to specimens in the form of binary signals, however since many analog or physical items may be represented by a binary value, the present explanation using binary specimens will be useful.

Consider three sets of specimens, referred to as set A, set B, and set C. Each set contains nine specimens characterized as ten bit binary numbers. Sets A, B, and C appear as follows in Table I.

*Table I*

SET A

| | 1 | 2 | 3 | 4 | 5 | 6 | 7 | 8 | 9 | 10 |
|---|---|---|---|---|---|---|---|---|---|---|
| A1 | 0 | 0 | 1 | 1 | 0 | 1 | 0 | 1 | 0 | 1 |
| A2 | 0 | 1 | 1 | 1 | 0 | 1 | 1 | 0 | 1 | 1 |
| A3 | 1 | 0 | 1 | 1 | 0 | 1 | 0 | 0 | 1 | 1 |
| A4 | 0 | 1 | 1 | 1 | 1 | 0 | 0 | 1 | 0 | 0 |
| A5 | 0 | 0 | 1 | 1 | 0 | 0 | 0 | 0 | 0 | 0 |
| A6 | 0 | 1 | 1 | 0 | 0 | 0 | 0 | 0 | 0 | 1 |
| A7 | 0 | 0 | 1 | 1 | 0 | 1 | 0 | 1 | 1 | 1 |
| A8 | 0 | 0 | 1 | 1 | 0 | 1 | 1 | 1 | 1 | 0 |
| A9 | 1 | 0 | 1 | 0 | 0 | 1 | 1 | 1 | 0 | 1 |

SET B

| | | | | | | | | | | |
|---|---|---|---|---|---|---|---|---|---|---|
| B1 | 1 | 1 | 1 | 1 | 0 | 0 | 0 | 0 | 0 | 0 |
| B2 | 1 | 1 | 1 | 1 | 1 | 1 | 1 | 0 | 0 | 0 |
| B3 | 0 | 0 | 0 | 0 | 0 | 0 | 1 | 0 | 0 | 1 |
| B4 | 1 | 1 | 1 | 0 | 1 | 0 | 1 | 0 | 1 | 1 |
| B5 | 0 | 1 | 0 | 0 | 1 | 0 | 0 | 0 | 1 | 1 |
| B6 | 1 | 1 | 0 | 1 | 1 | 0 | 1 | 0 | 0 | 0 |
| B7 | 1 | 1 | 1 | 0 | 1 | 0 | 0 | 0 | 0 | 0 |
| B8 | 1 | 1 | 0 | 1 | 0 | 1 | 1 | 0 | 1 | 0 |
| B9 | 1 | 0 | 0 | 0 | 0 | 0 | 0 | 0 | 0 | 1 |

SET C

| | | | | | | | | | | |
|---|---|---|---|---|---|---|---|---|---|---|
| C1 | 0 | 0 | 0 | 1 | 1 | 1 | 1 | 0 | 0 | 1 |
| C2 | 0 | 0 | 0 | 1 | 1 | 1 | 1 | 0 | 1 | 1 |
| C3 | 0 | 1 | 1 | 1 | 1 | 0 | 0 | 1 | 1 | 1 |
| C4 | 1 | 0 | 0 | 1 | 1 | 0 | 1 | 1 | 1 | 1 |
| C5 | 0 | 0 | 0 | 1 | 1 | 1 | 1 | 1 | 1 | 1 |
| C6 | 0 | 1 | 0 | 0 | 0 | 1 | 1 | 1 | 1 | 0 |
| C7 | 0 | 1 | 0 | 0 | 0 | 1 | 0 | 0 | 0 | 1 |
| C8 | 0 | 0 | 0 | 1 | 1 | 1 | 0 | 1 | 1 | 0 |
| C9 | 1 | 0 | 0 | 0 | 1 | 0 | 1 | 1 | 1 | 1 |

| 1 | 2 | 3 | 4 | 5 | 6 | 7 | 8 | 9 | 10 |
|---|---|---|---|---|---|---|---|---|---|

Sets A, B, and C set forth, for purposes of illustration, twenty-seven distinct ten-bit binary words. The ten-bit binary words are grouped into the sets of which they are members, the sets being referred to as set A, set B, and set C. As previously mentioned, set A may refer to a given phonetic sound such as "oo" and specimens A1 through A9 may represent the digitized sound wave patterns of nine different persons speaking the sound "oo." Likewise set B may refer to the sound "ee" and set C may refer to the sound "ah." In another example, set A may represent the letter A and specimens A1 through A9 may be the digitized representations of the characteristics of nine different persons handwriting the letter A. Likewise set B may represent the letter B and set C may represent the letter C.

In the embodiment to be described, a specimen identification system will be discussed wherein an unknown specimen, referred to as the input specimen, is introduced to the system.

Referring to FIG. 1, a schematic block diagram is shown wherein three channels are connected to a common input means 10. Channel 1 includes inclusive test means 12, 30, 48, and 66. Channel 2 includes inclusive test means 14, 32, and 50, and channel 3 includes inclusive test means 16, 34, and 52. Input means 10 is the source of the digitized unknown input specimen. Input means 10 may, if the system is employed for character recognition, be an optical reading device which converts the graphic character being scanned into a digital representation of the black and white portions of the character. If the system is to be employed for speech recognition, input means 10 may be a microphone device for receiving spoken sounds and for converting such sounds into a digital equivalent. Broadly, input means 10 produces a digital output signal representing the unknown input specimen to be identified.

The output of input means 10 is a ten-bit binary signal representative of the input specimen, one or more bits of which are coupled to test means 12, 14, 16, 30, 32, 34, 48, 50, 52, and 66 as schematically shown. Test means 12 performs what is referred to as an inclusive test for set A, test means 14 performs an inclusive test for set B, and test means 16 performs an inclusive test for set C. The meaning of the term inclusive test will be more clearly understood as the system is described, however it has hereinabove been defined as a test which will pass all specimens for which it is designed. Thus, an inclusive test for set A is one which will pass any one of the specimens A1 through A9. The inclusive test for set A should reject as many as possible specimens not belonging to class A. However, as will be shown, the inclusive test for set A will also pass a percentage of specimens belonging to sets B and C. Likewise, inclusive test means 14 will pass a percentage of specimens from sets A and C in addition to all the members of set B and inclusive test means 16 will pass a percentage of specimens from sets A and B in addition to all the members of set C. The criteria for the inclusive test, for example for set A, is that any specimen in set A will be passed, and any rejected specimen will not therefore be a member of set A. An inclusive test for set B will pass all members of set B and an inclusive test for set C will pass all members of set C.

Inclusive test means 12, 14, and 16, respectively, include output leads 18, 20, and 22 referred to as pass leads. The pass leads 18, 20, and 22 will conduct a "pass" indication signal in response to the specimens which pass each respective associated test means.

Output pass lead 18 from inclusive test means 12 is connected to an "AND" circuit 82, output pass lead 20 from inclusive test means 14 is connected to an "AND" circuit 84, and output pass lead 22 from inclusive test means 16 is connected to an "AND" circuit 86. Lead 18 from inclusive test means 12 is also connected to an "AND" circuit 128 and to "OR" circuits 90 and 92.

Lead 20 from inclusive test means 14 is also connected to an "AND" circuit 132 and to "OR" circuits 88 and 92, and lead 22 from inclusive test means 16 is also connected to an "AND" circuit 136 and to "OR" circuits 88 and 90. The output of "OR" circuit 88 is directly connected to "AND" circuit 82 and to "AND" circuit 128 via inverter circuit 126, the output of "OR" circuit 90 is directly connected to "AND" circuit 84 and to "AND" circuit 132 via inverter circuit 130, and the output of "OR" circuit 92 is directly connected to "AND" circuit 86 and to "AND" circuit 136 via inverter circuit 134. The output of "AND" circuit 82 is connected to an "AND" circuit 156 via an enabling lead 94, the output of "AND" circuit 84 is connected to an "AND" circuit 208 via an enabling lead 96, and the output of "AND" circuit 86 is connected to an "AND" circuit 224 via an enabling lead 98. The outputs from "AND" circuits 128, 132, and 136 are respectively connected to indicator devices 120, 122, and 124 to be later described.

A second level of tests including the inclusive test means 30, 32, and 34 are responsive to given ones of the bits of the input specimen from specimen input means 10. It was stated that inclusive test means 12 is designed to pass, that is, to provide a pass signal, onto output lead 18 in response to any specimen belonging to set A and that some specimens belonging to set B and set C may also be passed and provide a pass signal on lead 18. Second level inclusive test means 30 is an inclusive test for those specimens from set A which may pass the test within inclusive test means 12 and also the test within inclusive test means 14 and/or inclusive test means 16. Thus, inclusive test means 30 is referred to as performing an inclusive test for those set A specimens which are capable of passing both inclusive test means 12 and at least one other of the inclusive test means 14 and 16. Likewise inclusive test means 32 performs an inclusive test for those set B specimens which are capable of passing both inclusive test means 14 and at least one other of the inclusive test means 12 and 16. Inclusive test means 34 performs an inclusive test for those set C specimens which are capable of passing both inclusive test means 16 and at least one other of the inclusive test means 12 and 14.

An input specimen from set A capable of passing the test within inclusive test means 14 and/or 16 will produce an output signal from "OR" circuit 88 which is "ANDed" with the pass signal on lead 18 at "AND" circuit 82 to provide an enabling signtl to "AND" circuit 156 via enabling lead 94. An input specimen from set B capable of passing the test within inclusive test means 12 and/or 16 will produce an output signal from "OR" circuit 90 which is "ANDed" with the pass signal on lead 20 at "AND" circuit 84 to provide an enabling signal to "AND" circuit 208 via enabling lead 96. An input specimen from set C capable of passing the test within inclusive test means 12 and/or 14 will produce an output signal from "OR" circuit 92 which is "ANDed" with the pass signal on lead 22 at "AND" circuit 86 to provide an enabling signal to "AND" circuit 224 via enabling lead 98. The enabling signals on leads 94, 96, and 98, respectively, determine whether the results of test means 30, 32, and 34 will be utilized.

Second level inclusive test means 30, 32, and 34 perform inclusive tests for set A, set B, and set C specimens respectively, however, each of these tests are generally narrower than the first level test means 12, 14, and 16. For example, inclusive test means 12 is designed to pass all members of specimen set A, i.e., A1 through A9. Inclusive test means 30, however, is designed to pass all members of specimen set A which may pass test means 12 and at least one other of test means 14 and 16. This is generally a smaller specimen set and the test within test means 30 may be narrower than the test within test means 12. The same is true for inclusive test means 32 and 34. Inclusive test means 30, 32, and 34, respectively, include output pass leads 42, 44, and 46, a signal on which indicates that the input specimen has passed the test within the associated inclusive test means. As previously stated the signals appearing on leads 94, 96, and 98 are enabling signals, that is, a pass signal from inclusive test means 30, 32, and 34 on leads 42, 44, and 46 will not be utilized and conducted to the next level test unless a signal is present on associated leads 94, 96, and 98, respectively.

All specimens of set A will pass inclusive test means 12 and cause a pass signal to be introduced to "AND" circuit 82 via lead 18. Inclusive test means 30 is designed to pass those set A specimens, which are capable of passing the test within test means 12, and at least one other of test means 14 and 16. However, a percentage of the specimens of sets B and C will also be capable of passing the test within inclusive test means 30 and will cause a pass signal to appear on pass lead 42.

In like manner inclusive test 32 is designed as an inclusive test for set B specimens which passed the test within test means 14 and the test within test means 12 and/or 16 and to provide in response thereto a pass signal on pass lead 44. Inclusive test means 32, while designed to pass all set B specimens which passed the test within test means 14 and at least one other of test means 12 and 16, may also pass a percentage of set A and set C specimens which passed test means 14 and will cause a pass signal to appear on pass lead 44.

Likewise, inclusive test means 34, while designed to pass those set C specimens which passed inclusive test means 16 and at least one other of test means 12 and 14 may also be passed by some percentage of specimens from sets A and B.

The output of "AND" circuit 156 associated with test means 30 is connected to an output lead 36 which is in turn connected to the input of an "AND" circuit 100, output lead 38 is connected between the output of "AND" circuit 208 and the input of an "AND" circuit 102 and output lead 40 is connected between the output of "AND" circuit 224 and the input of an "AND" circuit 104.

The third level of tests includes inclusive test means 48, 50, and 52. Inclusive test means 48 is similar to inclusive test means 12 and 30 in that it is designed to be passed by specimens of set A, however, it is an even narrower test in that inclusive test means 48 is designed to be passed by those specimens of set A which passed the test within inclusive test means 30 and at least one other of inclusive test means 32 and 34. Likewise, inclusive test means 50 is designed to be passed by those specimens of set B which passed the test within inclusive test means 32 and at least one other of inclusive test means 30 and 34. Inclusive test means 52 is designed to be passed by those specimens of set C which passed the test within inclusive test means 34 and at least one other of inclusive test means 30 and 32.

Lead 36 from "AND" circuit 156 is also connected to "OR" circuits 108 and 110 and to "AND" circuit 140. Lead 38 from "AND" circuit 208 is connected to "OR" circuit 106 and 110 and to "AND" circuit 144, and lead 40 from "AND" circuit 224 is connected to "OR" circuits 106 and 108 and to "AND" circuit 148. The output of "OR" circuit 106 is directly connected to "AND" circuit 100 and to "AND" circuit 140 via inverter circuit 138, the output of "OR" circuit 108 is directly connected to "AND" circuits 102 and to "AND" circuit 144 via inverter circuit 142, and the output of "OR" circuit 110 is directly connected to "AND" circuit 104 and to "AND" circuit 148 via inverter circuit 146. The output of "AND" circuit 100 is connected to an "AND" circuit 166, associated with third level inclusive test means 48, via enabling lead 112, the output of "AND" circuit 102 is connected to an "AND" circuit 212, associated with third level inclusive test means 50, via enabling lead 114, and the output of "AND" circuit 104 is connected to an "AND"' circuit 234, associated with third level inclusive test means 52, via enabling lead 116. The outputs of "AND" circuits 140, 144, and 148 are respectively connected to indicator devices 120, 122, and 124.

Inclusive test means 48, 50, and 52 each respectively include pass leads 60, 62, and 64, respectively, connected to "AND" circuits 166, 212, and 234. Inclusive test means 48 will be passed by all the specimens from set A which also passed the test within test means 30 and at least one of the other test means 32 and 34 and may also be passed by a percentage of specimens from sets B and C. Specimens which are passed by test means 48 to produce an output signal on pass lead 60. Inclusive test means 50 will be passed by all the specimens from set B which were passed by test means 32 and at least one of the other test means 30 and 34 and may also be passed by a percentage of specimens from sets A and C. Specimens which are passed by test means 50 produce an output signal on pass lead 62. Inclusive test means 52 will be passed by all the specimens from set C which passed the test within test means 34 and at least one of the other test means 30 and 32 and may also be passed by a percentage of specimens from sets A and B. Specimens which are passed by the test within test means means 52 result in an output signal on pass lead 64. Output lead 54 from "AND" circuit 166 is connected to the input of an "AND" circuit 118 which is in turn connected to an "AND" circuit 190 associated with a fourth level inclusive test means 66 which is designed to be passed by specimens of set A which may be passed by the test within test means 48 and test means 50 and thereby provide an output signal on pass lead 70 and to reject any specimens of sets B and C which may be passed by the test within test means 48. The other input to "AND" circuit 118 is from enabling lead 56 of test means 50. A connection from test means 52 of channel 3 is not necesasry for reasons to be later explained. Lead 54 from "AND" circuit 166 is also connected to an "AND" circuit 169 and to an "AND" circuit 174 via inverter circuit 172. Lead 56 from "AND" circuit 212 is also connected to "AND" circuit 174 and to "AND" circuit 169 via inverter circuit 168. The output of "AND" circuit 169 is connected to indicator device 120, the output of "AND" circuit 174 is connected to an indicator device 122, and the output of test means 52 (lead 58 from "AND" circuit 234) is connected to indicator device 124.

The structure of FIG. 1 is a specimen identification system designed to identify the specimen set of which any of the twenty-seven specimens set forth in Table I is a member. For this reason, as will be later apparent, it is not necessary that a fourth level of test means be provided for the second (set B) channel and the third (set C) channel. The number of levels of test means required to identify an input specimen as a member of a given specimen set is determined by the quality and number of specimens contained in each of the sets. Furthermore, the specific circuits included in each of the inclusive tests are likewise determined by the specimen sets to be handled by the system.

From the description of the structure of FIG. 1 thus far, it is seen that to handle and ultimately identify a specimen as a member of a given one of a plurality of specimen sets, a test channel for each specimen set is provided. The first channel of FIG. 1 relates to specimen set A, the second channel of FIG. 1 relates to specimen set B and the third channel of FIG. 1 relates to specimen set C. If a greater number of specimen sets were involved, a channel for each would be provided. Each inclusive test means within each channel is connected to a common specimen input means which transmits given bits of the unknown input specimen to each of the inclusive test means. The first level of test means in each channel is designed to be passed by all the specimens within the associated specimen set and may also be passed by some of the specimens of the other specimen sets while rejecting others of the other specimen sets. The second level of test means in each channel is designed to be passed by those specimens of the associated set which are capable of being passed by more than one of the first level tests, and may be passed by some of the specimens within the other specimen sets while rejecting others of the other specimen sets. The third level of test means in each channel is again designed to be passed by specimens of the associated specimen set, but the test is still narrower in that only those specimens of the associated specimen set which are capable of being passed by more than one of the second leve test means are considered. Each channel will contain a series of inclusive test means for passing specimens of the associated specimen set which pass more than one of the test means of the previous level. The test will be progressively narrower since the number of possible specimens to be considered will become less and less as each test level is reached. This is due to the identification of specimens by the preceding test means.

In addition to the specimen input means 10 and the various inclusive test means, the system of FIG. 1 includes indicator devices associated with each of the channels 1, 2, and 3 to indicate of which specimen set the input specimen is a member. An identification is effected when only one inclusive test on a level is passed. Thus, inclusive test means 12 is designed to pass all members of specimmen set A, inclusive test means 14 is designed to pass all members of specimen set B and inclusive test means 16 is designed to pass all members of specimen set C. If an input specimen passes test means 12, this indicates that the specimen may be an A specimen and if test means 14 and 16 are failed, it indicates that the input specimen cannot be a B or C specimen and therefore the input specimen must be a member of set A. Likewise, if test means 14 is passed and test means 12 and 16 are failed, the input specimen must be a member of set B and if test means 16 is passed and test means 12 and 14 are failed the input specimen must be a member of set C. It is to be noted that if only one test means on the first level is passed, there will be no output signals from any of the "AND" circuits 82, 84, and 86.

If the input specimen is one which cannot be identified by the first level tests, more than one of the first level tests will be passed and two or more of the second level tests will be performed. Once again, if only one of the second level test means is passed, the input specimen is a member of the set associated with such test means, i.e., if only test means 30 is passed, the input specimen is a member of set A, if only test means 32 is passed, the input specimen is a member of set B, and if only test means 34 is passed, the input specimen is a member of set C. If more than one of the second level test means are passed, it means that the input specimen cannot be identified by the second level tests and that the third level tests must be performed.

The system of FIG. 1 was constructed to handle the specimen sets A, B, and C of FIG. 1. It will be later shown that in addition to test means 48, 50, and 52, each being passed singly, the only combination of more than one test means on the third level being passed is test means 48 and test means 50 being both passed by certain set A specimens. Thus, output lead 58 from "AND" circuit 234 associated with test means 52 need not be connected over to either channel 1 or channel 2 since a signal on lead 58 will only occur when the input specimen is a member of set C and in such event test means 48 and test means 50 will not be passed. If only test means 48 is passed, it is indicative that the input specimen is a member of set A and if only test means 50 is passed, it is indicative that the input specimen is a member of set B. If both test means 48 and 50 are passed, then the fourth level test 66 must be performed ("AND" circuit 118 will be gated) and if test means 66 is passed, it is indicative that the specimen is a member of set A.

Three indicator devices 120, 122, and 124 are provided for indicating whether the input specimen is a member of set A, set B, or set C. The indicator devices may be, for example, lamps which when illuminated indicate whether an input specimen is a member of set A, set B, or set C. Since the input specimen may be identified at the first, second, third, or fourth test levels, the indicator devices 120, 122, and 124 must be connected to the test means at each such level. Indicator device 120 indicates that the input specimen is a member of set A and is therefore associated with the test means of channel 1. It was stated that if only one test means at each level is passed, then the input specimen is a member of the set for which the inclusive test means is designed to pass. Thus, if test means 12 is passed and test means 14 and 16 are failed, the input specimen is a member of set A. For this condition there will be a signal present on pass lead 18 and no signal output from "OR" circuit 88. The output of "OR" circuit 88 is coupled to an inverter circuit 126 and pass lead 18 and the output of inverter circuit 88 are connected to an "AND" circuit 128 so that when there is a signal on pass lead 18 and no signal output from "OR" circuit 88, which is connected to pass leads 20 and 22 of test means 14 and 16, an output signal will be provided at the output of "AND" circuit 128 to actuate indicator device 120 and indicate that the input specimen is a member of set A. Similarly, the output of "OR" circuit 90 is connected to an inverter circuit 130 and the output of inverter circuit 130 is connected along with pass lead 20 to an "AND" circuit 132, the output of which is connected to indicator device 122 to indicate that the input specimen is a member of set B when only test means 14 of the first level is passed. Also, the output of "OR" circuit 92 is connected to an inverter circuit 134, the output of which is connected along with pass lead 22 to an "AND" circuit 136. The output of "AND" circuit 136 is connected to indicator device 124 to indicate that the input specimen is a member of set C when only test means 16 of the first level is passed. If more than one of the test means 12, 14, or 16 is passed, there will be no output signals produced by "AND" circuits 128, 132, or 136 and no indicator devices will be actuated by the results of the first level tests. Instead given ones of "AND" circuits 82, 84, and 86 will be gated and enabling signals will be present on respective leads 94, 96, and 98 to indicate that the results of the second level tests should be utilized.

At the second level of test, a passing of only one test means is also indicative that the input specimen is a member of the specimen set associated with that test means. Thus, output lead 36 of "AND" circuit 156 is connected along with the output of "OR" circuit 106 (via inverter circuit 138) to an "AND" circuit 140 which is in turn connected to indicator device 120. Likewise, output lead 38 of "AND" circuit 208 is connected along with the output of "OR" circuit 108 (via inverter circuit 142) to an "AND" circuit 144 which is in turn connected to indicator device 122 and the output lead 40 of "AND" circuit 224 is connected along with the output of "OR" circuit 110 (via inverter circuit 146) to an "AND" circuit 148 which is in turn connected to indicator device 124. Thus, if only one of the second level test means are passed (and the preceding test means in the first level is also passed) the appropriate indicator device will be actuated to indicate the identity of the input specimen.

At the third level of tests, a signal on output lead 58 of "AND" circuit 234 associated with test means 52 indicates that the input specimen is a member of set C since when test means 52 is passed an analysis of the specimen sets shows that neither test means 48 nor test means 50 can be also passed. Thus lead 58 can be directly connected to indicator device 124. Test means 48, on the other hand, may be passed at the same time that test means 50 is passed, therefore output lead 54 of "AND" circuit 166 is connected to an "AND" circuit 118 along with output lead 56 from "AND" circuit 212 associated with test means 50. Lead 54 is also connected to "AND" circuit 169 as is lead 56 via an inverter circuit 168. If only test means 48 is passed "AND" circuit 169 is gated and indicator device 120 is actuated, indicating that the specimen is a member of set A. If test means 50 is also passed, "AND" circuit 118 is gated and an enabling signal is applied to "AND" circuit 190 associated with fourth level test means 66 via lead 170.

If test means 50 is passed and test means 48 is not passed, there will be an output signal from an inverter circuit 172 which is applied to an "AND" circuit 174 to gate the output signal on lead 56 to lead 176 to actuate indicator device 122 to indicate that the input specimen is a member of set B.

The passing of the fourth level test means 66 can only mean that the input specimen is a member of set A and therefore output lead 68 from "AND" circuit 190 is connected directly to indicator device 120.

One or more bits of the input specimen from specimen input means 10 are applied to all the inclusive test means in FIG. 1, however, the full operation of any of the second level test means requires that more than one of the first level test means have been passed. If only one of the first level test means has been passed, it means that the input specimen has been identified and the appropriate one of the indicator devices 120, 122, or 124 will be actuated. Consequently, there will be no enabling signals produced by any of the "AND" circuits 82, 84, or 86, and an enabling signal from these "AND" gates is necessary before any pass signals from the second level test means 30, 32, and 34 on leads 42, 44, and 46 may be gated by "AND" circuits 156, 208, and 224 to provide output signals on output leads 36, 38, and 40.

Likewise, more than one of the second level test means must be passed in order to gate the pass signals of the third level test means, and both third level test means 48 and 50 must be passed to gate the pass signal of test means 66.

The system shown in FIG. 1 will be more clearly understood by illustrating the operation in conjunction with the specimen sets A, B, and C set forth in Table I. It was stated that test means 12 (FIG. 1) is designed to be passed by all the specimens of specimen set A. The specimens in set A, namely specimens A1 through A9, are ten-bit binary words which differ from each other and from each of the other specimens in sets B and C. It would be possible to construct a test which recognizes only specimens A1 through A9 and rejects specimens B1 through B9 and C1 through C9. This could be accomplished by storing separate representations of specimens A1 through A9 and comparing the unknown input specimens therewith on a bit-by-bit basis. A match would indicate that the input specimen was a set A specimen and a mismatch would indicate that the input specimen was not a set A specimen. This would involve only one level of testing but would require complex logic and comparator circuits. One of the intentions of the present invention is to avoid such complex test structures and accomplish the specimen recognition by means of a series of simple test means connected in series.

Thus a simple test means which may be passed by any of the specimens in specimen set A of Table I (the criteria for inclusive test means 12) is to design a device to pass any specimen having a "1" bit in the third bit position. This is not a narrow test and consequently specimens B1, B2, B4, B7, and C3 will likewise pass the test and result in a pass signal on pass lead 18. Specimens B3, B5, B6, B8, B9, C1, C2, C4, C5, C6, C7, C8, and C9, having "0" bits in the third bit position, will fail the test and result in no pass signal appearing on lead 18. For the sake of clarity, the tests performed by each of the inclusive test means in FIG. 1 and the specimens of Table I which pass or fail such tests are set forth below in more or less tabular form.

(1) First level tests:
Test means 12—
Intent: To pass all specimens in specimen set A.
Test criteria: "1" bit in third bit position.
Specimens which will pass and produce a pass signal on lead 18: A1 through A9 and B1, B2 B4, B7, and C3.
Specimens which fail: B3, B5, B6, B8, B9, C1, C2, C4, C5, C6, C7, C8, and C9.
Test means 14—
Intent: To pass all specimens in specimen set B.
Test criteria: "0" bit in eighth bit position.
Specimens which will pass and produce a pass signal on lead 20: B1 through B9 and A2, A3, A5, A6, C1, C2, and C7.
Specimens which fail: A1, A4, A7, A8, A9, C3, C4, C5, C6, C8, and C9.
Test means 16—
Intent: To pass all specimens in specimen set C.
Test criteria: "1" bits in the fourth, fifth, and tenth bit positions or a "0" bit in the third bit position.
Specimens which will pass and produce a pass signal on lead 22: C1 through C9 and B3, B5, B6, B8, and B9.
Specimens which fail: B1, B2, B4, B7 and A1 through A9.
Specimens of set A which are identified and actuate indicator device 120: A1, A4, A7, A8, and A9.
Specimens of set B which are identified and actuate indicator device 122: None.
Specimens of set C which are identified and actuate indicator device 124: C4, C5, C6, C8, and C9.
(2) Second level tests:
Test means 30—
Intent: To pass all set A specimens which can pass test means 12 and test means 14 and/or 16 (i.e., A2, A3, A5, and A6).
Test criteria: "0" bits in fifth and eighth bit positions.
Specimens which will pass and produce a signal on output lead 36: A2, A3, A5, A6, and B1.
Specimens which passed test means 12 and test means 14 and/or 16 and which fail test means 30: B2, B4, B7, and C3.
Test means 32—
Intent: To pass all set B specimens which can pass test means 14 and test means 12 and/or 16 (i.e., B1 through B9).
Test criteria: "0" bit in ninth bit position, or "1" bit in fifth and "0" bit in sixth bit positions, or "1" bit in first and "0" bits in third and fifth bit positions.
Specimens which will pass and produce a signal on output lead 38: A5, A6, C1, C7, and B1 through B9.
Specimens which passed test means 14 and test means 12 and/or 16 and which fail test means 32: A2, A3, and C2.
Test means 34—
Intent: To pass all set C specimens which can pass test means 16 and test means 12 and/or 14 (i.e., C1, C2, C3, and C7).
Test criteria: "0" bit in first and "1" bit in tenth bit position.
Specimens which will pass and produce a signal on output lead 40: B3, B5, C1, C2, C3, and C7.
Specimens which passed test means 16 and test means 12 and/or 14 and which fail test means 34: B6, B8, and B9.
Specimens of set A which are identified and actuate indicator device 120: A2 and A3.
Specimens of set B which are identified and actuate indicator device 122: B2, B4, B6, B7, B8, and B9.
Specimens of set C which are identified and actuate indicator device 124: C2 and C3.

(3) Third level tests:
Test means 48—
Intent: To pass all set A specimens which can pass test means 30 and test means 32 and/or 34 (i.e., A5 and A6).
Test criteria: "0" bits in first, sixth, seventh, and ninth bit positions.
Specimens which will pass and produce a signal on output lead 54: A5 and A6.
Specimens which passed test means 30 and test means 32 and/or 34 and which fail test means 48: B1.
Test means 50—
Intent: To pass all set B specimens which can pass test means 32 and test means 30 and/or 34 (i.e., B1, B3, and B5).
Test criteria: "0" bit in sixth bit position.
Specimens which will pass and produce a signal on output lead 56: A5, A6, B1, B3, and B5.
Specimens which passed test means 32 and test means 30 and/or 34 and which fail test means 50: C1 and C7.
Test means 52—
Intent: To pass all set C specimens which can pass test means 34 and test means 30 and/or 32 (i.e., C1 and C7).
Test criteria: "1" bit in sixth and "0" bits in third, eighth, and ninth bit positions.
Specimens which will pass and produce a signal on output lead 58: C1, and C7.
Specimens which passed test means 34 and test means 30 and/or 32 and which fail test means 52: B3 and B5.
Specimens of set A which are identified and actuate indicator device 120: None.
Specimens of set B which are identified and actuate indicator device 122: B1, B3, and B5.
Specimens of set C which are identified and actuate indicator device 124: C1 and C7.

NOTE.—At the third level tests, no set B specimens may pass the test within either test means 48 or test means 52 and there is no necessity for a fourth level test for set B specimens in channel 2. All set B specimens are identified within three test levels. Likewise, no set C secimens may pass the test within test means 48 or 50 and there is no necessity for a fourth level test for set C specimens in channel 3 since all set C specimens are identified within three test levels. Specimens from set A (i.e., A5 and A6) may pass the test within test means 50 as well as test means 48 so there is a need for a fourth level test for set A specimens (i.e., A5 and A6) in channel 1.

(4) Fourth level test:
Test means 66—
Intent: To pass all set A specimens which can pass test means 48 and test means 50 and/or 52 (i.e., A5 and A6).
Test criteria: "1" bit in fourth and "0" bits in second and tenth bit positions, or "0" bit in fourth and "1" bits in second and tenth bit positions.
Specimens which will pass and produce a signal on output lead 68: (A5 and A6). The signal on lead 68 actuates indicator means 120.

Figure 2:
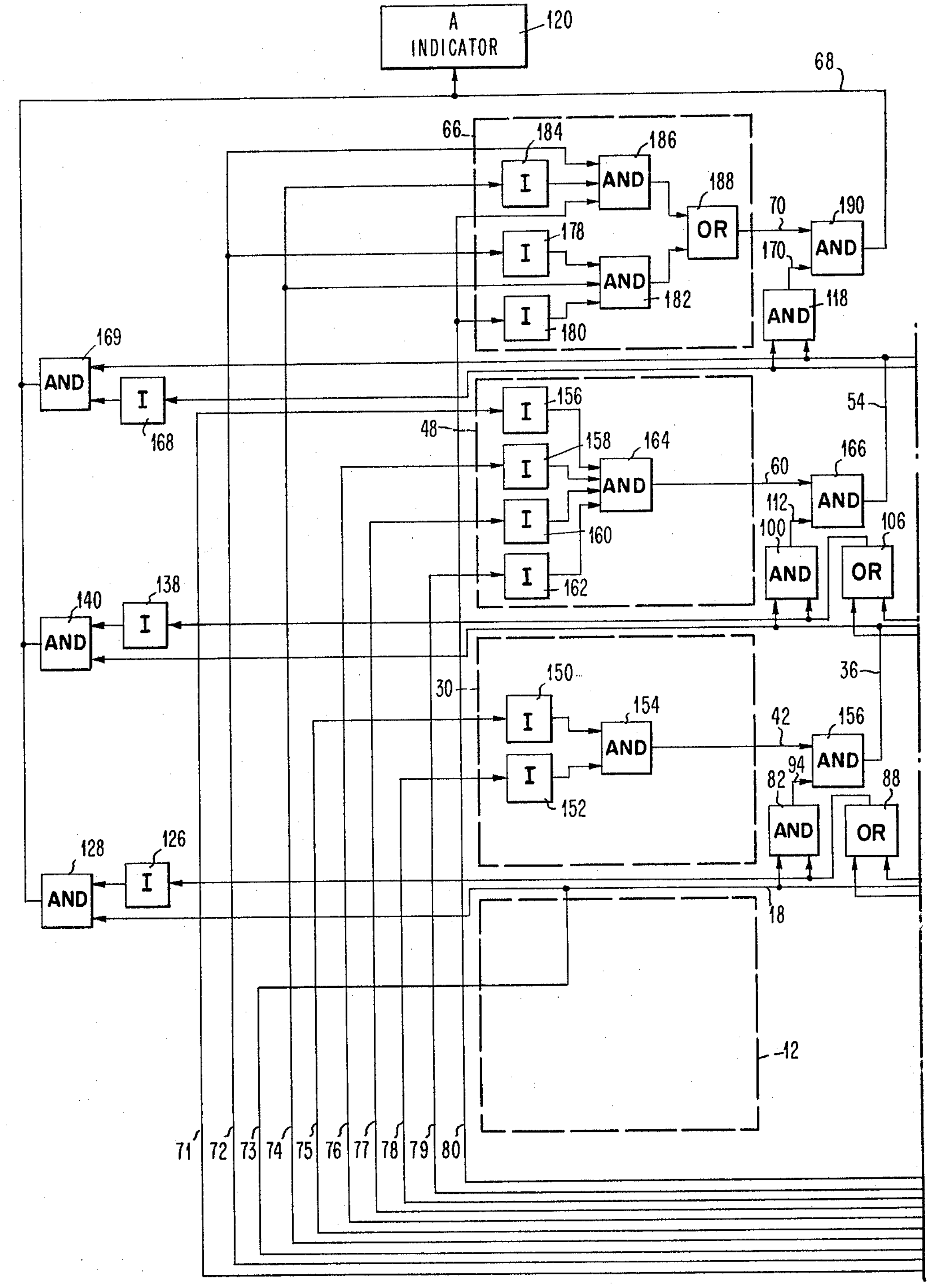
FIG. 2 is a block diagram showing the details of channel 1 of the embodiment of FIG. 1.
Figure 3:
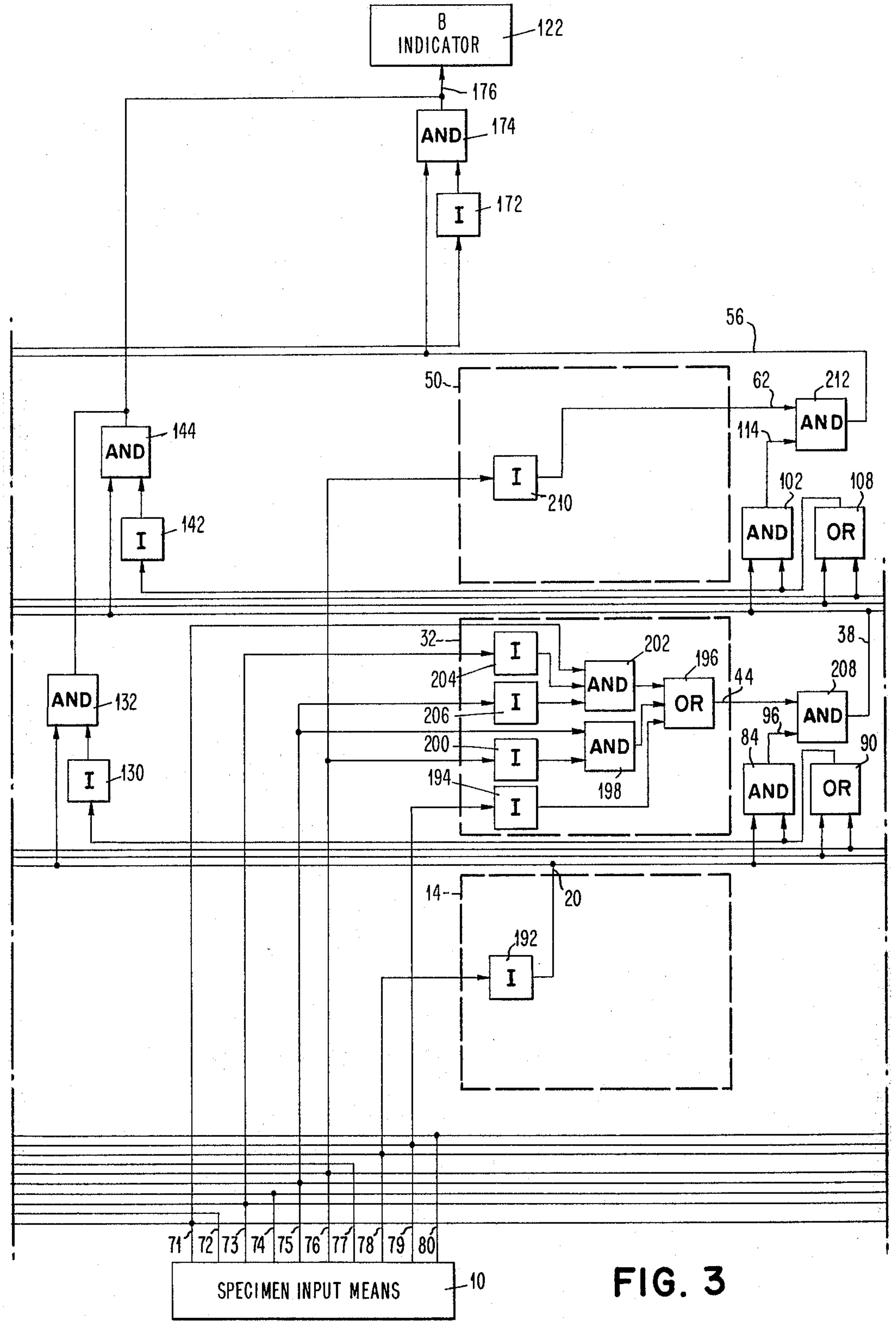
FIG. 3 is a block diagram showing the details of channel 2 of the embodiment of FIG. 1.
Figure 4:
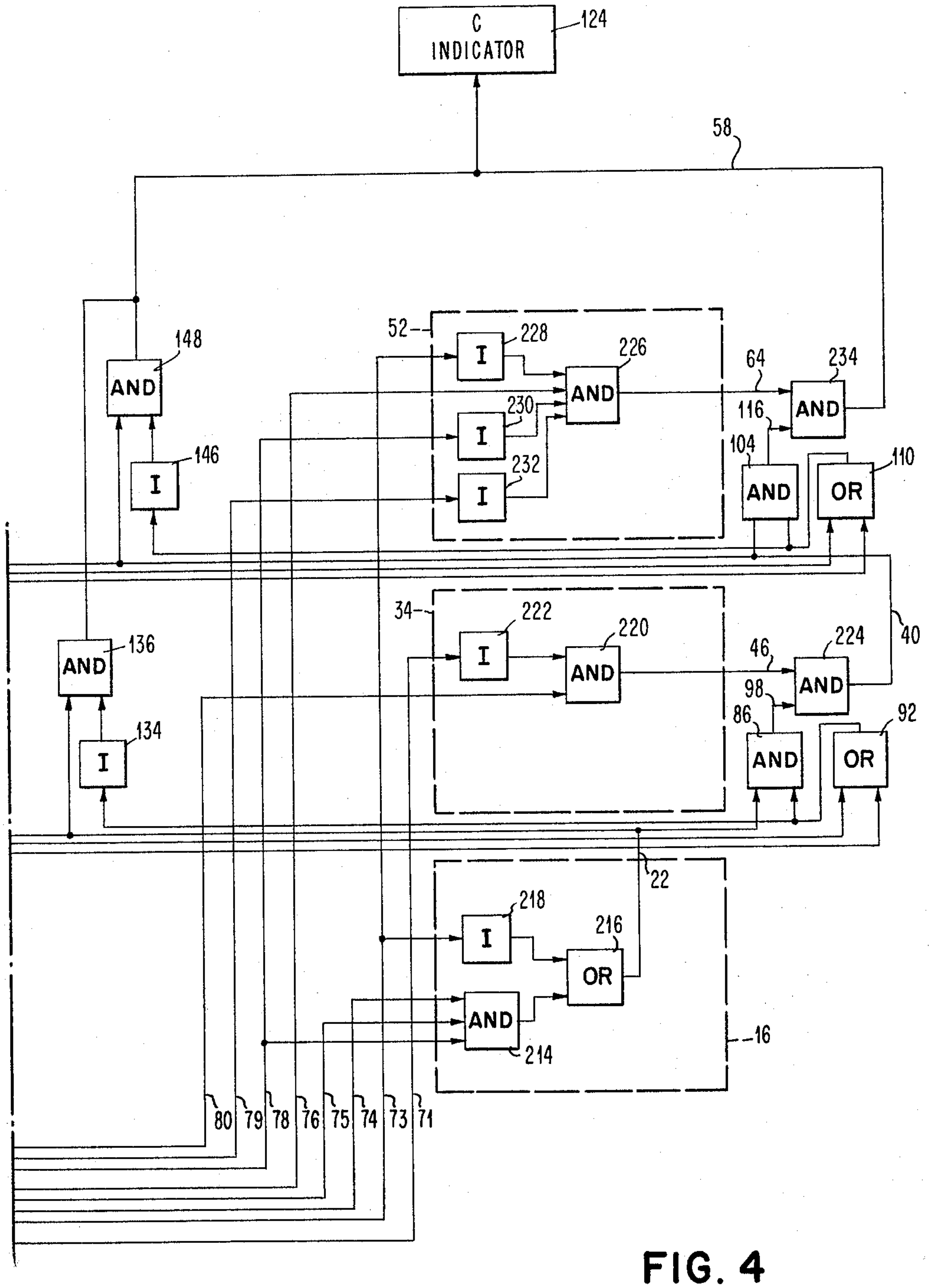
FIG. 4 is a block diagram showing the details of channel 3 of the embodiment of FIG. 1.

The circuits employed for each of the test means 12, 14, 16, 30, 32, 34, etc., are determined by the test criteria for each test means. In FIGS. 2, 3, and 4 the circuits for the test means in channel 1, 2, and 3 of FIG. 1 are respectively shown. The circuits shown in FIGS. 2, 3, and 4 are designed to perform exclusive tests relative to the specimens set forth in sets A, B, and C of Table I. It is to be understood that the particular circuits employed in the inclusive test depicted in FIG. 1 will vary in accordance with the particular specimen sets with which the system is to be used. Likewise the number of test levels necessary in each test channel will also vary in accordance with the particular specimen sets under consideration. Generally the number of levels necessary in the test channels of a given system will be a function of the relative similarity of the specimens in each set to the specimens in each of the other sets being employed.

Referring to FIG. 2, the circuits included in each of the inclusive test means 12, 30, 48, and 66 of channel 1 of FIG. 1 are shown. As previously stated, inclusive test means 12 tests for a "1" bit in the third bit position of the input specimen; inclusive test means 30 tests for a "0" bit in the fifth and eighth bit positions of the input specimen; inclusive test means 48 tests for a "0" bit in the first, sixth, seventh, and ninth bit positions of the input specimen; and inclusive test means 66 tests for a "1" bit in the fourth and "0" bits in the second and tenth bit positions or a "0" bit in the fourth and "1" bits in the second and tenth bit positions of the input specimen.

Referring now to FIG. 3, the specimen input means 10 of FIG. 1 is shown having ten output leads therefrom numbered from 71 through 80 and respectively associated with the first through the tenth bit positions of the input specimen. As stated hereinabove, specimen input means 10 is the means by which an input specimen is received. Specimen input means 10 may be an optical scanner for pattern recognition applications, a microphone device for speech recognition applications, or any other suitable transducer depending on the environment to which the specimen recognition device is to be applied. Since the present explanation is directed to specimens in the form of ten-bit binary words, specimen input means 10 may also include an analog-to-digital converter to convert the received specimen into a ten-bit digital representation and to apply the bits thereof to the ten output leads 71 through 80 via a storage register or the like. Particular ones of output leads 71 through 80 are connected to the separate inclusive test means in each of the three test channels.

Referring again to FIG. 2, inclusive test means 12 determines whether a "1" bit is present in the third bit position of the input specimen and, if present, will provide an output signal on pass lead 18. If a "0" bit is present in the third bit position of the input specimen, inclusive test means 12 will not provide an output signal on pass lead 18. Thus, inclusive test means 12 is connected to lead 73 (associated with the third bit position of the input specimen from specimen input means 10 of FIG. 3) and includes only a direct connection to lead 18. If a "1" bit is present on lead 73, it indicates that the input specimen may be a member of set A, and therefore the signal is merely connected onto pass lead 18. If a "0" bit is present in the third bit position, it indicates that the input specimen cannot be an "A" and zero signal is applied to pass lead 18. When a "1" bit is present on lead 18, it is applied to "AND" circuits 82 and 128. If neither test means 14 or test means 16 has been passed, the output from "OR" circuit 81 will be zero, "AND" circuit 128 will be gated, and indicator device 120 will be actuated. "AND" circuit 82 will not be gated, there being no output signal from "OR" circuit 88.

Presume that a "1" bit is present on lead 73 and an output signal is thereby present on pass lead 18, indicative that the input specimen may be a member of set A. Presume also that at least one of test means 14 or 16 has been passed so that an output signal from "OR" circuit 88 is present and "AND" circuit 82 but not "AND" circuit 128 is gated. A signal is then applied to test means 30 via enabling lead 94.

Referring to FIG. 1, if test means 14 has been passed in addition to test means 12, it is noted that "AND" circuit 84 will be gated and a signal will be present on enabling lead 96, and if test means 16 has also been passed, "AND" circuit 86 will be gated and a signal will be present on enabling lead 98. For clarity, however, each channel will be explained separately even though operation may be simultaneous, so reference is again made to FIG. 2.

Test means 30 performs an inclusive test for all members of set A capable of passing test means 12 and test means 14 and/or 16. The test, as previously stated, is to determine if the input specimen has "0" bits in the fifth and eighth bit positions. Test means 30 includes inverter circuits 150 and 152 connected respectively to leads 75 and 78 of specimen input means 10. The outputs of inverter circuits 150 and 152 are applied to "AND" circuit 154 which will provide an output signal on pass lead 42 if the test is satisfied. It is necessary to perform the test of test means 30 only if test means 12 and test means 14 and/or test means 16 have been passed. In other words, "0" bit signals on leads 75 and 78 should produce an output signal on output lead 36 only if an enabling signal is also present on lead 94 from "AND" circuit 82. This is effected by connecting the output of "AND" circuit 154 (pass lead 42) and lead 94 to an "AND" circuit 156, the output of "AND" circuit 156 being conencted to output lead 36. Thus, an output signal from "AND" circuit 154 on pass lead 42 and an enabling signal on lead 94 is required in order to provide an output signal on lead 36. If no output signal is present on pass lead 42 at the output of "AND" circuit 154, it is indicative that the input specimen has not passed the test within test means 30. If no enabling signal is present on lead 94, it is indicative that either test means 12 has not been passed or that only test means 12 of the first level test has been passed.

Presume that test means 30 has been passed so that there is a signal on lead 42 and an enabling signal is also present on lead 94. An output signal will then be present on lead 36 and be applied to "AND" circuits 100 and "AND" circuit 140. If neither of test means 32 and 34 (FIG. 1) have not been passed, there will be no output signal from "OR" circuit 106 and the complementary signal from inverter circuit 138 will cause "AND" circuit 140 to be gated and indicator device 120 will be actuated. If either or both of test means 32 and 34 (FIG. 1) have been passed, there will be an output signal from "OR" circuit 106 and "AND" circuit 100 rather than "AND" circuit 140 will be gated and an enabling signal will be applied to test means 60 via lead 112.

Test means 48 performs an inclusive test for specimens of set A which may be passed by test means 30 and test means 32 and/or 34. Test means 48 tests the input specimen for the presence of "0" bits in the first, sixth, seventh, and ninth bit positions and therefore includes inverter circuits 156, 158, 160, and 162, respectively connected to leads 71, 76, 77, and 79. The outputs of inverter circuits 156, 158, 160, and 162 are connected to an "AND" circuit 164 so that a pass signal is produced at the output of "AND" circuit 164 on pass lead 60 if the test conditions are satisfied. The test within test means 48 need only be performed if test means 30 has been passed and at least one of test means 32 and 34 has also been passed. Thus, enabling lead 112 is "ANDed" with the output of "AND" circuit 164 on pass lead 60 at "AND" circuit 166 so that an output signal is produced on lead 54 only if the aforesaid conditions are satisfied.

If the aforesaid conditions are satisfied, the output signal on lead 54 is applied to "AND" circuit 166 and "AND" circuit 118. Output lead 56 from "AND" circuit 212 associated with test means 50 is directly connected to "AND" circuit 118 and to "AND" circuit 169 via inverter circuit 168. If only test means 48 is passed, "AND" circuit 169 will be gated and indicator device 120 will be actuated. If test means 50 is also passed, (i.e., if there is a signal on output lead 56) "AND" circuit 118 is gated and a signal is applied to "AND" circuit 190 via enabling lead 170.

Test means 66 tests the input specimen for either "0" bits in the second and tenth and a "1" bit in the fourth bit positions, or "1" bits in the second and tenth and a "0" bit in the fourth bit positions. Thus, "AND" circuit 182 is connected to leads 72 and 80 via inverter circuits 178 and 180, respectively, and directly to lead 74 and "AND" circuit 186 is connected directly to leads 72 and 80 and to lead 74 via inverter circuit 184. The outputs of "AND" circuits 182 and 186 are connected to "OR" circuit 188 which will produce a pass signal on pass lead 70 if either or both of the test conditions are satisfied by the input specimen. The output of "OR" circuit 188 (pass lead 70) is connected along with enabling lead 170 to "AND" circuit 190 so that an output signal is produced on output lead 68 only if the test of test means 66 is passed and if both test means 48 and 50 have also been passed. Output lead 68 is connected to indicator device 120 to indicate that the specimen is a member of set A when an output signal is present on lead 68.

FIG. 3 shows the circuits included in each of the test means 14, 32, and 50 of channel 2. Test means 14 is designed to pass all specimens of set B and tests for the presence of a "0" bit in the eighth bit position of the input specimen. Thus, an inverter circuit 192 is connected to lead 78 from specimen input means 10. The occurrence of a "0" bit on lead 78 results in an output signal on pass lead 20 which is applied to "AND" circuits 132 and 84. If only test means 14 has been passed, there will be no output from "OR" circuit 90 which, when inverted by inverter circuit 130, will gate "AND" circuit 132 and indicator device 122 will be actuated. If either or both of test means 12 and 16 have also been passed, there will be an output signal from "OR" circuit 90 and "AND" circuit 84 will be gated and an enabling signal will be applied to "AND" circuit 208 via lead 96.

Test means 32 is designed to pass all set B specimens which may pass more than one of the first level test means. Test means 32 test the input specimen for the presence of a "0" bit in the ninth bit position or a "1" bit in the fifth and a "0" bit in the sixth bit positions, or a "1" bit in the first and "0" bits in the third and fifth bit positions. Thus, lead 78 is connected through an inverter circuit 194 to "OR" circuit 196. Lead 75 is directly connected to an "AND" circuit 198 and lead 76 is connected to "AND" circuit 198 via inverter circuit 200 and the output of "AND" circuit 198 is connected to "OR" circuit 196. Lead 71 is connected to an "AND" circuit 202 and leads 73 and 75 are connected respectively through inverter circuits 204 and 206 to "AND" circuit 202, the output of which is also connected to "OR" circuit 196 so that if one or more of the test criteria are satisfied, a pass signal is produced by "OR" circuit 196 on pass lead 44. If a pass signal is produced by "OR" circuit 194 on pass lead 44 and an enabling signal is present on lead 96, an "AND" circuit 208 will be gated and an output signal will be provided on output lead 38.

The output signal on lead 38 is applied to "AND" circuit 102 and "AND" circuit 144. If neither test means 30 nor test means 34 have been passed, the zero signal from "OR" circuit 108 is inverted by inverter circuit 142 and "AND" circuit 144 is gated, actuating indicator device 122. If either or both of test means 30 and 34 are also passed, "AND" circuit 102 is instead gated and an enabling signal is applied to "AND" circuit 212 via lead 114.

Test means 50 tests for the presence of a "0" bit in the sixth bit position of the input specimen, therefore lead 76 is connected to an inverter circuit 210 so that, if a "0" bit is present, a "1" bit signal will be applied to "AND" circuit 212 on pass lead 62. The other input to "AND" circuit 212 is lead 214, and if an enabling signal is present thereon, "AND" circuit 212 will be gated and an output signal will be present on lead 56. Lead 56 is connected to "AND" circuit 174 and inverter circuit 168 of FIG. 2. The other input to "AND" circuit 174 is obtained from output lead 54 (FIG. 2) via inverter circuit 174 and the output of "AND" circuit 174 is connected to indicator device 122 via lead 176. The operation of inverter circuit 172 and "AND" circuit 174 has been described in connection with FIG. 1.

Referring to FIG. 4, the circuits included in each of the test means 16, 34, and 52 of channel 3 are shown. Test means 16 tests for the presence of "1" bits in the fourth, fifth, and tenth bit positions of the input specimens, or for a "0" bit in the third bit position. Thus, leads 74, 75, and 80 of specimen input means 10 (FIG. 3) are coupled to "AND" circuit 214, the output of which is connected to "OR" circuit 216, and lead 73 of input specimen means 10 (FIG. 3) is coupled to "OR" circuit 216 via an inverter circuit 218. If either or both of the test conditions are satisfieed, a pass signal is produced on lead 22 which is applied to "AND" circuits 136 and 86.

If test means 12 and 14 have not been passed, there will be a zero output signal from "OR" circuit 92 which will (via inverter circuit 134) cause "AND" circuit 136 to be gated and indicator device 124 to be actuated. If test means 12 and/or 10 were passed, there will be an output signal from "OR" circuit 92 and "AND" circuit 86 is gated applying an enabling signal to "AND" circuit 224 via lead 98.

Test means 34 tests for a "0" bit in the first and a "1" bit in the tenth bit positions of the input specimen and includes an "AND" circuit 220 connected directly to lead 80 and to lead 71 via inverter circuit 222. The output of "AND" circuit 220 is connected to "AND" circuit 224 via pass lead 46 along with enabling lead 98 so that if the test of test means 34 is passed and an enabling signal is present on lead 98, an output signal is produced on lead 40 and applied to "AND" circuit 104 and "AND" circuit 148. If test means 30 and/or test means 32 are not passed, "AND" circuit 148 is gated and indicator device 124 is actuated. If test means 30 and/or test means 32 are also passed, "AND" circuit 104 is gated and an enabling signal is applied to "AND" circuit 234 via enabling lead 116.

Test means 52 tests the input specimen for the presence of a "1" bit in the sixth bit position and "0" bits in the third, eighth, and ninth bit positions. Thus, lead 76 is directly connected to "AND" circuit 226 and leads 73, 78, and 79 are connected to "AND" circuit 226 via inverter circuits 228, 230, and 232, respectively. The "AND" circuit 226 will produce a pass signal on pass lead 64 if the test is satisfied which is connected to "AND" circuit 234 along with enabling lead 116. The output signal from "AND" circuit 234 is applied to indicator device 124 via output lead 58 if an enabling signal is also present on lead 116.

The system of FIG. 1, more particularly illustrated in FIGS. 2, 3, and 4, provides an identification as to which specimen set an input specimen from Table I is a member. If the input specimen is a member of set A, "A" indicator device 120 is actuated, if the input specimen is a member of set B, indicator device 122 is actuated, and if the input specimen is a member of set C, indicator device 124 is actuated. With a system designed according to the principles of the present invention and operated with the specimens set forth, a substitution error, that is, a specimen of one set being identified as a member of a different set, will not occur.

The system includes inclusive tests which pass all members of the class for which they are designed. The inclusive tests examine specimens for a given characteristic to determine if they are a member of the class, and since the characteristic is generally not complex, the individual inclusive tests are of simple construction.

What has been described is a specimen identification system for determining the identity of an unknown input specimen. The invention described has utility in a wide variety of specimen environments. For purposes of explanation the specimens set forth in the embodiment were in the form of binary signals, however, the principles set forth are not limited to any one particular signal environment or any particular class of specimen sets. Also, for purposes of simplicity, the explanation of the system operation was presented with three specimen sets A, B, and C. This is not to be construed as a limitation on the handling capabilities of any system embodied under the principles of the present invention. The principles are applicable to a system for handling a greater or lesser number of specimen sets.

It is also to be understood that the specific inclusive tests included in each test means of FIGS. 2, 3 and 4 and the specific circuits shown therein for carrying out the tests are presented for illustration only. The tests and circuits shown and described relate only to the specimen of specimen sets A, B, and C, which were established only for purposes of explanation. In actual practice the inclusive tests and the circuits therefor will be determined by the actual specimens to be handled. However, as previously stated, the principles of the invention set forth herein may be applied to any practical specimen identification problem by one skilled in the art, and a suitable array of inclusive test and circuits therefor may be readily devised to operate with such specimens.

It will be appreciated that the circuits in FIGS. 2, 3, and 4 are of simple construction, and carry out the specific test for which they were designed. To provide a more versatile overall system it is suggested that tests could be of the adaptive type, this is, the circuits, when presented to the specimens of the sets to be handled, will self-adapted to form the required tests. Self-adapting specimen recognition devices are known in the art, and no example will be given herein, however, it is suggested that a more sophisticated embodiment of the present invention is possible if self-adaptive test structures are incorporated rather than having to predesign each of the circuits of the inclusive test means for fixed sets of specimens.

While the invention has been particularly shown and described with reference to a preferred embodiment thereof, it will be understood by those skilled in the art that various changes in form and details may be made therein without departing from the spirit and scope of the invention.

What is claimed is:

1. A recognition system for identifying input specimens as members of given specimen classes comprising,
  an input means responsive to an input specimen selected from said given specimen classes for generating signals characteristic thereof,
  a plurality of test channels connected to said input means, each of said test channels being associated with a separate specimen class, each of said test channels including a plurality of test means directly connected to said input means for performing separate specific tests on said characteristic signals, and for producing an output signal when said test is satisfied,
  a first test means of said plurality of test means in each one of said test channels including a test designed to be satisfied by all of the members of the specimen class associated with each said given test channel,
  a second test means of said plurality of test means in each of said test channels including a test designed to be satisfied by those members of the specimen classes associated with said given test channel which are capable of satisfying the test included in said first test means in said given test channel and at least one other of the first test means in the others of said plurality of test channels,
  the remainder of said plurality of test means in each one of said test channels including tests designed to be satisfied by the members of said specimen class associated with said given test channel which are capable of also satisfying each preceding test in said given test channel and at least one other immediately preceding test means in the others of said plurality of test channels,
  and gating means connected to each of said test means, said gating means interconnecting the test means in each test channel with given ones of the test means in the other test channels such that said output signals from each test means must be gated by an output signal from the preceding test means in each test channel in combination with an output signal from at least one other preceding test means in said other test channels.

2. A recognition system for identifying input specimens as members of given specimen classes comprising:
  an input means,
  a plurality of test channels connected to said input means, each of said test channels being associated with a separate specimen class,
  each of said test channels including a plurality of separate test means having input terminals and an output lead,
  gating means connecting said output lead of each test means in each test channel to the output leads of each of the successive test means in all of said plurality of test channels,
  a separate indicator device associated with each test channel and connected to the output leads of each of the test means therein and to the output leads of each of the test means of the other of said plurality of test channels,
  said input means responsive to an input specimen for generating signals characteristic thereof, said input means being connected to said input terminals of each of said test means in each of said test channels for applying at least one of said signals characteristic of said input specimen to each of said test means for actuating said indicator device associated with said test channel representative of the specimen class of said input specimen.

3. A recognition system for identifying input specimens according to claim 2 wherein each of said test means is responsive to at least one of said characteristic signals from said input means for testing said at least one signal for selected qualities and for providng an output signal on the said output lead thereof when said qualities are present.

4. A recognition system for identifying input specimens accordng to claim 3 wherein an output signal on said output lead of each test means must be gated by an output signal on said first output lead of the preceding test means in the same test channel in combination with at least one output signal from an immediately preceding test means in the other of said plurality of test channels and applied via said gating means.

5. A recognition system for identifying input specimens as members of given specimen classes comprising:
  a plurality of test channels, each of said test channels being associated with a separate specimen class,
  each of said test channels including a plurality of separate inclusive test means having input terminals and an output lead, successive inclusive test means in each channel being connected to the output lead of the preceding inclusive test means via a gating means,
  an indicator device associated with each one of said test channels and connected to the output leads of said inclusive test means in said one test channel and to the output leads of the inclusive test means in the others of said plurality of test channels, and an input means responsive to an input specimen for generating signals characteristic thereof, said input means being connected to said input terminals of said inclusive test means in each of said channels for applying at least one of said signals characteristic of said input specimen to said inclusive test means for actuating said indicator device associated with said test channel representative of the specimen class of said input specimen.

6. A recognition system for identifying input specimens as members of given specimen classes comprising:

a plurality of test channels, each of said test channels being associated with a separate specimen class, each of said test channels including a plurality of inclusive test means responsive to an input specimen selected from said given specimen classes, each of said inclusive test means in each test channel including inclusive tests for specimens of the specimen class associated with said test channel, gating means interconnected between each of said inclusive test means in each test channel such that said inclusive test means in each test channel are connected to each other in serial fashion, and each test means in each channel is also connected to given ones of said test means in said other of said plurality of channels, and a plurality of indicator means, each one associated with and connected to the inclusive test means in a separate one of said test channels for indicating whether said input specimen is a member of said specimen class associated with each of said test channels.

7. A recognition system according to claim 6 wherein a first inclusive test means in each test channel includes an inclusive test for all members of the specimen class associated with said given test channel, a second inclusive test means in each test channel coupled to said first inclusive test means in said given test channel and said first inclusive test means in said other of said plurality of test channels, each one of said second inclusive test means including an inclusive test for all members of the specimen class associated with said given test channel capable of passing said first inclusive test means in said given test channel and at least one other first inclusive means in the other of said plurality of test channels, and wherein successive inclusive test means in each test channel include an inclusive test for all members of said specimen class associated with said given test channel which are capable of passing the preceding inclusive test means in said given test channel and at least one preceding inclusive test means in said other of said plurality of test channels.

8. A recognition system according to claim 7 wherein said inclusive test means in each test channel include an output lead, each of said inclusive test means providing an output signal on said output lead when said input specimen satisfies said inclusive test therein.

9. A recognition system according to claim 8 wherein said output lead of said first inclusive test means in each test channel is connected to a first gating circuit in each test channel along with said output leads of said first inclusive test means in the other of said test channels, the output of said first gating circuit in each test channel being logically combined with the output lead of said second inclusive test means in said test channel, and wherein said output lead of said second inclusive test means in each test channel is connected to a second gating circuit in each test channel along with said output leads of said second inclusive test means in the other of said test channels, the output of said second gating circuit in each test channel being logically combined with the output lead of the next successive inclusive test means in said test channel, and wherein each successive inclusive test means in each test channel being similarly connected to an associated gating circuit.

References Cited by the Examiner

UNITED STATES PATENTS

| | | | |
|---|---|---|---|
| 3,074,050 | 1/1962 | Shultz ------------ | 340—146.3 |
| 3,152,318 | 10/1964 | Swift ------------- | 340—146.3 |
| 3,167,745 | 1/1965 | Bryan et al. ------- | 340—146.3 |

MAYNARD R. WILBUR, *Primary Examiner.*

MALCOLM A. MORRISON, *Examiner.*

J. E. SMITH, *Assistant Examiner.*